United States Patent
Jost et al.

(10) Patent No.: US 11,102,649 B2
(45) Date of Patent: Aug. 24, 2021

(54) WIRELESS COMMUNICATIONS

(71) Applicant: Telefonaktiebolaget LM Ericsson (publ), Stockholm (SE)

(72) Inventors: Christine Jost, Lund (SE); Noamen Ben Henda, Stockholm (SE); Qian Chen, Mölndal (SE); Peter Hedman, Helsingborg (SE); Lars-Bertil Olsson, Angered (SE); Vesa Torvinen, Sauvo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/481,761

(22) PCT Filed: Jan. 30, 2018

(86) PCT No.: PCT/EP2018/052302
§ 371 (c)(1),
(2) Date: Jul. 29, 2019

(87) PCT Pub. No.: WO2018/138381
PCT Pub. Date: Aug. 2, 2018

(65) Prior Publication Data
US 2019/0387407 A1    Dec. 19, 2019

Related U.S. Application Data

(60) Provisional application No. 62/451,961, filed on Jan. 30, 2017.

(51) Int. Cl.
*H04W 12/04* (2021.01)
*H04W 76/25* (2018.01)
(Continued)

(52) U.S. Cl.
CPC .............. *H04W 12/04* (2013.01); *H04W 8/08* (2013.01); *H04W 12/03* (2021.01);
(Continued)

(58) Field of Classification Search
CPC . H04W 12/0401; H04W 12/06; H04W 12/04; H04W 12/04031; H04W 12/0013
See application file for complete search history.

(56) References Cited

U.S. PATENT DOCUMENTS

2018/0324594 A1* 11/2018 Chen ................. H04W 12/1205
2019/0014530 A1*  1/2019 Aghili ................. H04W 28/12
(Continued)

FOREIGN PATENT DOCUMENTS

WO    2010/004295 A2    1/2010
WO    2015/160329 A1   10/2015

OTHER PUBLICATIONS

International Search Report and Written Opinion dated Mar. 29, 2018 issued in International Application No. PCT/EP2018/052302. (11 pages).

(Continued)

*Primary Examiner* — Jung H Park
(74) *Attorney, Agent, or Firm* — Rothwell, Figg, Ernst & Manbeck, P.C.

(57) ABSTRACT

A method for operating a User Equipment (UE) is disclosed, wherein the UE is served by a source first network function in a first network and requires to register with a target second network function in a second network. The method comprises generating a registration request with integrity protection for at least a part of the registration request (1200), and sending an integrity protected part of the registration request to the source first network function via the target second network function (1202). Also disclosed are methods of operating first and second network functions.

8 Claims, 8 Drawing Sheets

(51) Int. Cl.

| | |
|---|---|
| *H04W 8/08* | (2009.01) |
| *H04W 60/00* | (2009.01) |
| *H04W 12/03* | (2021.01) |
| *H04W 12/104* | (2021.01) |
| *H04W 12/108* | (2021.01) |
| *H04W 12/00* | (2021.01) |
| *H04W 12/041* | (2021.01) |

(52) U.S. Cl.
CPC ....... *H04W 12/104* (2021.01); *H04W 12/108* (2021.01); *H04W 60/00* (2013.01); *H04W 76/25* (2018.02); *H04W 12/009* (2019.01); *H04W 12/041* (2021.01)

(56) References Cited

U.S. PATENT DOCUMENTS

| | | | |
|---|---|---|---|
| 2019/0037516 A1* | 1/2019 | Kim | H04W 60/005 |
| 2019/0274039 A1* | 9/2019 | Prasad | H04W 12/06 |
| 2019/0335332 A1* | 10/2019 | Ying | H04W 12/0602 |
| 2020/0029297 A1* | 1/2020 | Baek | H04W 4/06 |
| 2020/0059989 A1* | 2/2020 | Velev | H04W 36/12 |
| 2020/0068481 A1* | 2/2020 | Kim | H04W 36/00 |
| 2020/0245237 A1* | 7/2020 | Kim | H04W 48/18 |

OTHER PUBLICATIONS

ETSI TS 123 401 V11.3.0 (Nov. 2012; LTS; General Packet Radio Service (GPRS) enhancements for Evolved Universal Terrestrial Radio Access Network (E-UTRAN) access (3GPP TS 23.401 version 11.3.0 Release 11), (Nov. 2012). (285 pages).

* cited by examiner

WIRELESS COMMUNICATIONS

CROSS REFERENCE TO RELATED APPLICATION(S)

This application is a 35 U.S.C. § 371 National Stage of International Patent Application No. PCT/EP2018/052302, filed Jan. 30, 2018, designating the United States and claiming priority to U.S. provisional application no. 62/451,961, filed on Jan. 30, 2017. The above identified applications are incorporated by reference.

TECHNICAL FIELD

The present disclosure relates to methods performed in a wireless communications system, and to user equipment devices and to network functions for use in such a system.

BACKGROUND

Currently, the 5G system is being standardized by 3GPP. It is expected that the system allows mobility from the Evolved Packet System (EPS) to the 5G system through attach or idle mode mobility. EPS uses the Tracking Area Update (TAU) procedure for location update during idle-mode mobility of the User Equipment device (UE), and the Attach procedure for attach. It is expected that 5G will provide procedures for location update and attach during mobility as well. For example, the location update and attach during mobility procedures may be special cases of a more general procedure and this more general procedure may be called the registration procedure.

When a UE moves from EPS coverage to 5G coverage through reattach or idle mode mobility, it will need to send a message to notify the 5G network of this location update and/or reattach. This message may be called a registration request.

If the UE moves within the EPS, TAU requests and Attach requests sent by the UE are processed in Mobility Management Entity (MME) nodes. If the UE moves within the 5G system, registration requests are processed in Access and Mobility Management Function (AMF) nodes. For interworking between EPS and the 5G system, an interface between an MME and an AMF based on the S10 interface between MMEs is expected.

SUMMARY

Aspects of the present disclosure seek to provide a mechanism for the protection of the registration request and hence mitigate against threats on the air interface such as man in the middle or replay attacks.

Other aspects of the present disclosure seek to provide a mechanism for a source MME to authenticate a UE on behalf of a target AMF.

According to the present invention, there is provided a method of operation of a User Equipment (UE), wherein the UE is served by a source first network function in a first network and requires to register with a target second network function in a second network. The method comprises: generating a registration request with integrity protection for at least a part of the registration request; and sending an integrity protected part of the registration request to the source first network function via the target second network function. The first and second network functions may be implemented in first and second network nodes, or may be at least partially implemented as virtualised network functions.

The first network function may be a Mobility Management Entity (MME) function, and/or the second network function may be an Access and Mobility Management Function (AMF) function.

The step of generating a registration request with integrity protection may comprise generating a Message Authentication Code (MAC). The step of generating the registration request with integrity protection may comprise generating a Message Authentication Code (MAC) using information shared between the UE and the source first network function. The first network function may be a Mobility Management Entity (MME) function, and the information that is shared between the UE and the source MME may then be at least a part of an Evolved Packet System (EPS) security context.

The first network function may be a Mobility Management Entity (MME) function, and an integrity protected part of the registration request may then be an Evolved Packet Core (EPC) Non-Access Stratum (NAS) message. The EPS NAS message may be integrity protected with the MAC generated using information shared between the UE and the source first network function. The EPC NAS message may be a Tracking Area Update (TAU) request. The TAU request may be parsable by the source MME. The EPC NAS message may be an Attach request. The Attach request may be parsable by the source MME.

The second network function may be an Access and Mobility Management Function (AMF) function, and the registration request may then be a 5G Non-Access Stratum (NAS) message. The step of generating the registration request with integrity protection may comprise generating a Message Authentication Code (MAC) using information shared between the UE and a network function in the second network. The network function in the second network may be the target second network function or another function in the second network. The information that is shared between the UE and a network function in the second network may be at least a part of a 5G security context. An integrity protected at least part of the registration request may be the whole registration request. The whole registration request may be integrity protected with the MAC generated using information shared between the UE and a network function in the second network. The registration request may be a mobility registration request. The registration request may be an initial registration request.

The method may further comprise retrieving an EPS security context used for communication with the source first network function, deriving a mapped 5G security context from the retrieved EPS security context, generating a Key Set Identifier, KSI, to identify the retrieved EPS security context, and including the KSI in the registration request.

According to the present invention, there is provided a User Equipment (UE), comprising a processor and a memory, the memory containing instructions for causing the processor to perform a method comprising, when the UE is served by a source first network function in a first network and requires to register with a target second network function in a second network: generating a registration request with integrity protection for at least a part of the registration request; and sending an integrity protected part of the registration request to the source first network function via the target second network function.

The first network function may be a Mobility Management Entity (MME) function, and/or the second network function may be an Access and Mobility Management Function (AMF) function.

The step of generating a registration request with integrity protection may comprise generating a Message Authentication Code (MAC). The step of generating the registration request with integrity protection may comprise generating a Message Authentication Code (MAC) using information shared between the UE and the source first network function. The first network function may be a Mobility Management Entity (MME) function, and the information that is shared between the UE and the source MME may then be at least a part of an Evolved Packet System (EPS) security context.

The first network function may be a Mobility Management Entity (MME) function, and an integrity protected part of the registration request may then be an Evolved Packet Core (EPC) Non-Access Stratum (NAS) message. The EPS NAS message may be integrity protected with the MAC generated using information shared between the UE and the source first network function. The EPC NAS message may be a Tracking Area Update (TAU) request. The TAU request may be parsable by the source MME. The EPC NAS message may be an Attach request. The Attach request may be parsable by the source MME.

The second network function may be an Access and Mobility Management Function (AMF) function, and the registration request may then be a 5G Non-Access Stratum (NAS) message. The step of generating the registration request with integrity protection may comprise generating a Message Authentication Code (MAC) using information shared between the UE and a network function in the second network. The network function in the second network may be the target second network function or another function in the second network. The information that is shared between the UE and a network function in the second network may be at least a part of a 5G security context. An integrity protected at least part of the registration request may be the whole registration request. The whole registration request may be integrity protected with the MAC generated using information shared between the UE and a network function in the second network. The registration request may be a mobility registration request. The registration request may be an initial registration request.

The method may further comprise retrieving an EPS security context used for communication with the source first network function, deriving a mapped 5G security context from the retrieved EPS security context, generating a Key Set Identifier, KSI, to identify the retrieved EPS security context, and including the KSI in the registration request.

According to the present invention, there is provided a User Equipment (UE), the UE being configured to perform the method set out above.

According to the present invention, there is provided a User Equipment (UE), comprising, for when the UE is served by a source first network function in a first network and requires to register with a target second network function in a second network: a generating module, for generating a registration request with integrity protection for at least a part of the registration request; and a sending module, for sending an integrity protected part of the registration request to the source first network function via the target second network function. The first and second network functions may be implemented in first and second network nodes, or may be at least partially implemented as virtualised network functions. According to the present invention, there is provided a computer program product, containing instructions for causing a User Equipment to perform a method as set out above.

According to the present invention, there is provided a method of operation of a source first network function in a first wireless communications network. The method comprises receiving at least a part of a registration request from a User Equipment (UE) via a target second network function in a second wireless communications network, wherein the source first network function is serving the UE, and wherein the received registration request requests registration with said target second network function. The method further comprises checking integrity of the received at least part of a registration request. The first and second network functions may be implemented in first and second network nodes, or may be at least partially implemented as virtualised network functions.

The first network function may be a Mobility Management Entity (MME) function, and/or the second network function may be an Access and Mobility Management Function (AMF) function.

The step of checking the integrity may comprise generating a Message Authentication Code (MAC). The step of checking the integrity may comprise generating the Message Authentication Code (MAC) using information shared between the UE and the source first network function. The first network function may be a Mobility Management Entity (MME) function, and the information that is shared between the UE and the source MME may then be at least part of an Evolved Packet System (EPS) security context.

The first network function may be a Mobility Management Entity (MME) function, and the integrity protected part of the registration request may then be an Evolved Packet Core (EPC) Non-Access Stratum (NAS) message. The EPC NAS message may be a Tracking Area Update (TAU) request. The TAU request may be parsable by the source MME. The EPC NAS message may be an Attach request. The Attach request may be parsable by the source MME.

The second network function may be an Access and Mobility Management Function (AMF) function, and the registration request may then be a 5G Non-Access Stratum (NAS) message. The integrity protected at least part of the registration request may be the whole registration request. The registration request may be a mobility registration request. The registration request may be an initial registration request.

The method may further comprise, in response to the received at least part of a registration request passing the integrity check, providing user information to the target second network function. The method may further comprise, in response to the received at least part of a registration request failing the integrity check, notifying the second network function that the UE may not be authenticated.

According to the present invention, there is provided apparatus for implementing a first network function for use in a first wireless communications network, the apparatus comprising a processor and a memory, the memory containing instructions for causing the processor to perform a method comprising: receiving at least a part of a registration request from a User Equipment (UE) via a target second network function in a second wireless communications network, wherein the source first network function is serving the UE, and wherein the received registration request requests registration with said target second network function, the method comprising: checking integrity of the received at least part of a registration request. The apparatus may for example comprise a network node and may comprise a plurality of network nodes. The first and second network functions may be implemented in first and second network nodes, or may be at least partially implemented as virtualised network functions. The first network function may be a Mobility Management Entity (MME) function, and/or the second network function may be an Access and Mobility Management Function (AMF) function.

The step of checking the integrity may comprise generating a Message Authentication Code (MAC). The step of checking the integrity may comprise generating the Message Authentication Code (MAC) using information shared between the UE and the source first network function. The first network function may be a Mobility Management Entity (MME) function, and the information that is shared between the UE and the source MME may then be at least part of an Evolved Packet System (EPS) security context.

The first network function may be a Mobility Management Entity (MME) function, and the integrity protected part of the registration request may then be an Evolved Packet Core (EPC) Non-Access Stratum (NAS) message. The EPC NAS message may be a Tracking Area Update (TAU) request. The TAU request may be parsable by the source MME. The EPC NAS message may be an Attach request. The Attach request may be parsable by the source MME.

The second network function may be an Access and Mobility Management Function (AMF) function, and the registration request may then be a 5G Non-Access Stratum (NAS) message. The integrity protected at least part of the registration request may be the whole registration request. The registration request may be a mobility registration request. The registration request may be an initial registration request.

The method may further comprise, in response to the received at least part of a registration request passing the integrity check, providing user information to the target second network function. The method may further comprise, in response to the received at least part of a registration request failing the integrity check, notifying the second network function that the UE may not be authenticated.

According to the present invention, there is provided apparatus for implementing a first network function, the apparatus being configured to perform a method as set out above. The apparatus may for example comprise a network node and may comprise a plurality of network nodes.

According to the present invention, there is provided apparatus for implementing a first network function for use in a first wireless communications network. The apparatus comprises: a receiving module for receiving at least a part of a registration request from a User Equipment (UE) via a target second network function in a second wireless communications network, wherein the source first network function is serving the UE, and wherein the received registration request requests registration with said target second network function. The apparatus further comprises a checking module for checking integrity of the received at least part of a registration request. The apparatus may for example comprise a network node and may comprise a plurality of network nodes. The first and second network functions may be implemented in first and second network nodes, or may be at least partially implemented as virtualised network functions.

According to the present invention, there is provided a computer program product, containing instructions for causing a first network function to perform a method in as set out above.

According to the present invention, there is provided a method of operation of a second network function in a second network. The method comprises: receiving a registration request from a User Equipment (UE); and forwarding a request to retrieve information about the UE to a first network function in a first network serving the UE. The first and second network functions may be implemented in first and second network nodes, or may be at least partially implemented as virtualised network functions.

The second network function may be an Access and Mobility Management Function (AMF) function, and/or the first network function may be a Mobility Management Entity (MME) function.

The method may comprise receiving the registration request from the User Equipment (UE) via an access network.

The request to retrieve information about the UE may comprise a context request. The first network function may be a Mobility Management Entity (MME) function, and the context request may then comprise a Tracking Area Update Request from the registration request. The first network function may be a Mobility Management Entity (MME) function, and the context request may then comprise the whole registration request.

The request to retrieve information about the UE may comprise an identification request. The first network function may be a Mobility Management Entity (MME) function, and the identification request may then comprise an Attach Request from the registration request. The first network function may be a Mobility Management Entity (MME) function, and the identification request may then comprise the whole registration request.

The request to retrieve information about the UE may comprise at least a part of the registration request, and said part of the registration request may be integrity protected.

The second network function may be an Access and Mobility Management Function (AMF) function and the first network function may be a Mobility Management Entity (MME) function and said part of the registration request may be integrity protected using an EPS security context.

The second network function may be an Access and Mobility Management Function (AMF) function and the first network function may be a Mobility Management Entity (MME) function and the registration request may be integrity protected using a 5G security context. The method may further comprise checking the integrity of the received registration request.

The step of checking the integrity may comprise generating a Message Authentication Code (MAC) using the 5G security context.

The method may further comprise, in response to the received registration request passing the integrity check, discarding a response received from the first network function to the request to retrieve information.

The method may further comprise, in response to the received registration request failing the integrity check, performing at least one of: deriving a mapped 5G security context from an EPS security context received from the first function in response to the request to retrieve information; or initiating an authentication procedure to create a new 5G security context.

The method may further comprise determining that the 5G security context used to integrity protect the registration request is unavailable, and performing at least one of: deriving a mapped 5G security context from an EPS security context received from the first function in response to the request to retrieve information; or initiating an authentication procedure to create a new 5G security context.

The second network function may be an Access and Mobility Management Function (AMF) function and the first network function may be a Mobility Management Entity (MME) function, and the registration request may include a Key Set Identifier, KSI. The method may further comprise using the KSI to identify an EPS security context from a response received from the first function to the request to retrieve information, and deriving a mapped 5G security context from the identified EPS security context.

According to the present invention, there is provided apparatus for implementing a second network function for use in a second wireless communications network, the apparatus comprising a processor and a memory, the memory containing instructions for causing the processor to perform a method comprising: receiving a registration request from a User Equipment (UE); and forwarding a request to retrieve information about the UE to a first network function in a first network serving the UE. The apparatus may for example comprise a network node and may comprise a plurality of network nodes. The first and second network functions may be implemented in first and second network nodes, or may be at least partially implemented as virtualised network functions.

The second network function may be an Access and Mobility Management Function (AMF) function, and/or the first network function may be a Mobility Management Entity (MME) function.

The method may comprise receiving the registration request from the User Equipment (UE) via an access network.

The request to retrieve information about the UE may comprise a context request. The first network function may be a Mobility Management Entity (MME) function, and the context request may then comprise a Tracking Area Update Request from the registration request. The first network function may be a Mobility Management Entity (MME) function, and the context request may then comprise the whole registration request.

The request to retrieve information about the UE may comprise an identification request. The first network function may be a Mobility Management Entity (MME) function, and the identification request may then comprise an Attach Request from the registration request. The first network function may be a Mobility Management Entity (MME) function, and the identification request may then comprise the whole registration request.

The request to retrieve information about the UE may comprise at least a part of the registration request, and said part of the registration request may be integrity protected.

The second network function may be an Access and Mobility Management Function (AMF) function and the first network function may be a Mobility Management Entity (MME) function and said part of the registration request may be integrity protected using an EPS security context.

The second network function may be an Access and Mobility Management Function (AMF) function and the first network function may be a Mobility Management Entity (MME) function and the registration request may be integrity protected using a 5G security context. The method may further comprise checking the integrity of the received registration request.

The step of checking the integrity may comprise generating a Message Authentication Code (MAC) using the 5G security context.

The method may further comprise, in response to the received registration request passing the integrity check, discarding a response received from the first network function to the request to retrieve information.

The method may further comprise, in response to the received registration request failing the integrity check, performing at least one of: deriving a mapped 5G security context from an EPS security context received from the first function in response to the request to retrieve information; or initiating an authentication procedure to create a new 5G security context.

The method may further comprise determining that the 5G security context used to integrity protect the registration request is unavailable, and performing at least one of: deriving a mapped 5G security context from an EPS security context received from the first function in response to the request to retrieve information; or initiating an authentication procedure to create a new 5G security context.

The second network function may be an Access and Mobility Management Function (AMF) function and the first network function may be a Mobility Management Entity (MME) function, and the registration request may include a Key Set Identifier, KSI. The method may further comprise using the KSI to identify an EPS security context from a response received from the first function to the request to retrieve information, and deriving a mapped 5G security context from the identified EPS security context.

According to the present invention, there is provided apparatus for implementing a second network function for use in a second wireless communications network, the apparatus being configured for performing a method in accordance with any of the methods set out above. The apparatus may for example comprise a network node and may comprise a plurality of network nodes. The first and second network functions may be implemented in first and second network nodes, or may be at least partially implemented as virtualised network functions.

According to the present invention, there is provided apparatus for implementing a second network function for use in a second wireless communications network, the apparatus comprising: a receiving module for receiving a registration request from a User Equipment (UE); and a forwarding module for forwarding a request to retrieve information about the UE to a first network function in a first network serving the UE. The apparatus may for example comprise a network node and may comprise a plurality of network nodes. The first and second network functions may be implemented in first and second network nodes, or may be at least partially implemented as virtualised network functions.

According to the present invention, there is provided a computer program product, containing instructions for causing a second network function to perform a method in accordance with any one of the methods set out above.

DETAILED DESCRIPTION

Aspects and examples of the disclosure are described with reference to EPS and 5G networks but it will be appreciated that they may be applicable to other networks.

Figure 1:
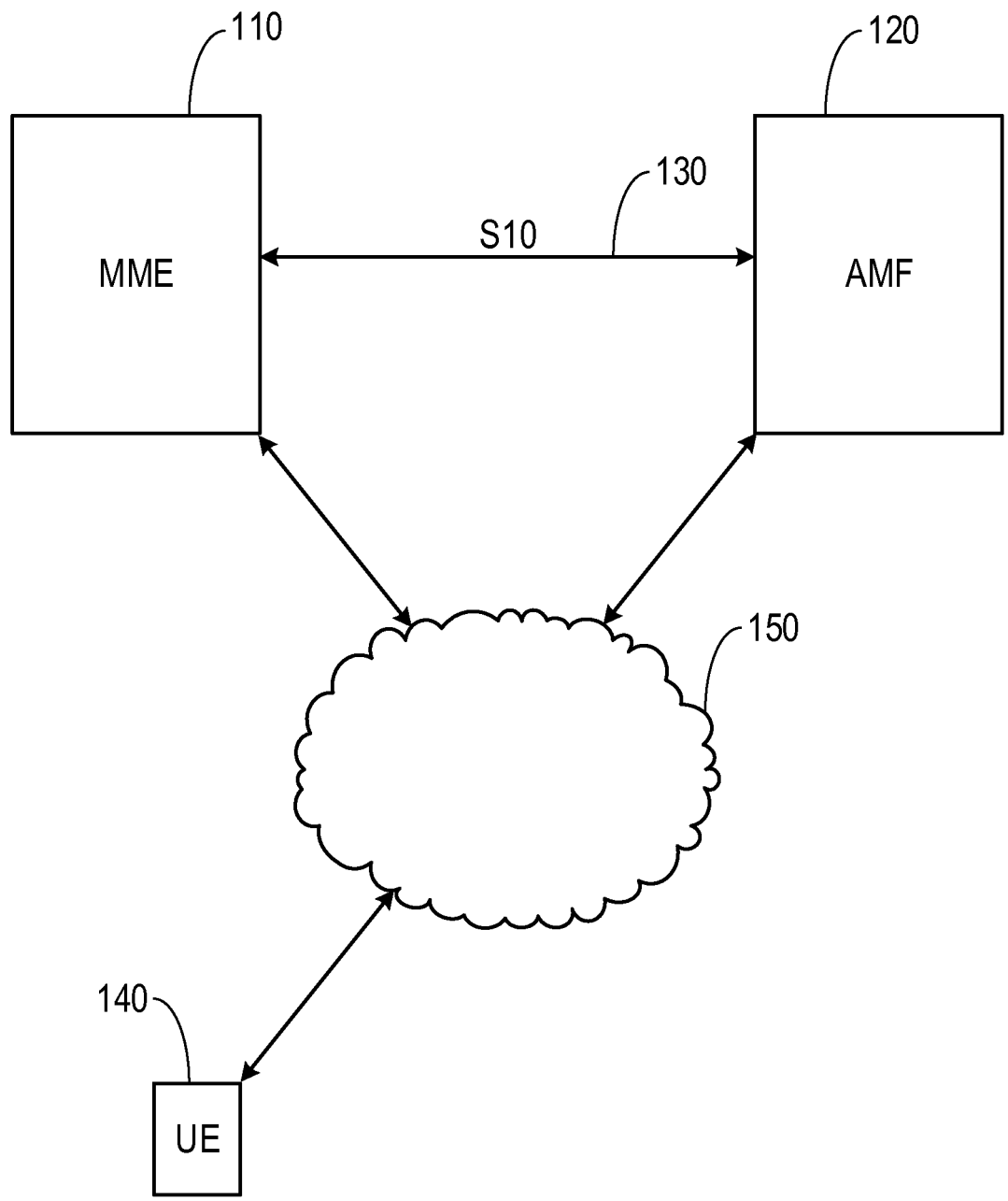
FIG. 1 illustrates a part of a wireless communications system.

FIG. 1 illustrates a part of a wireless communications system, comprising a first network function in a first network, and a second network function in a second network. In this illustrated example, the first network function is a Mobility Management Entity (MME) function 110, and the first network is an Evolved Packet System (EPS) network. Further, in this example, the second network function is an Access and Mobility Management Function (AMF) function 120, and the second network is a 5G network. Thus, the first network and the second network use different technologies or standards, but are managed by the same network operator and appear to the consumer as part of the same network. This illustrated example is used as the basis for further explanation below, but the methods described herein may be used for the interoperation of any two such networks. The first and second network functions may be implemented in first and second network nodes, or may be at least partially implemented as virtualised network functions.

In this example, there is an interface 130 between the first network function and the second network function. Specifically, in this illustrated example where the first network function is a Mobility Management Entity (MME) 110, and the second network function is an Access and Mobility Management Function (AMF) 120, the interface 130 can be the S10 interface or a modified version of the S10 interface.

FIG. 1 shows a user equipment device (UE) 140 that obtains service from the wireless communications network. The term user equipment device (UE) is used herein to refer to any terminal device, whether that device is intended to be a user-operated device such as a smartphone, tablet or laptop computer, or the like, or whether that device is intended to operate independently, for example as a remote sensor of the like. Similarly, the UE may be intended to operate from a generally fixed location, for example in the case of a closed-circuit TV camera or the like, or may be intended to be mobile, for example in the case of a smartphone, tablet or laptop computer, tracking device, or the like.

The UE 140 connects to the first network function and the second network function through one or more functions or nodes of one or more access networks (AN) 150, which may for example include a radio access network (RAN). Any suitable radio access technology may be used for enabling the connection of the UE 140 to the first network function and the second network function.

Figure 2:
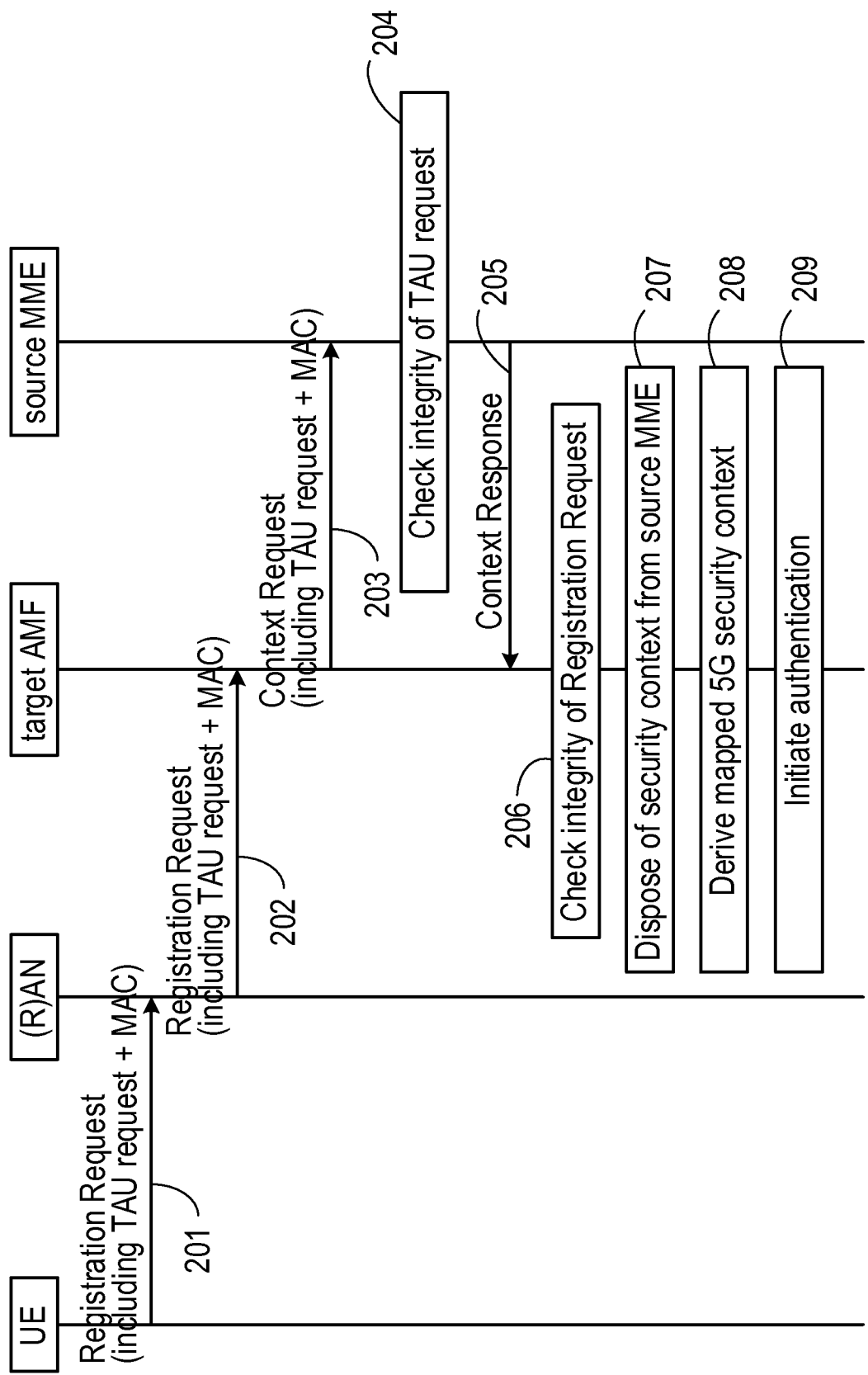
FIG. 2 is a signaling diagram illustrating a first procedure.

FIG. 2 is a signaling diagram illustrating a first procedure in the example where the first network function is a Mobility Management Entity (MME), and the second network function is an Access and Mobility Management Function (AMF).

Specifically, FIG. 2 illustrates a procedure where a UE is being served by a source MME, but requires to register with a target AMF. More specifically, FIG. 2 illustrates a procedure where the registration is based on location update, including a tracking area update (TAU).

In step 201, the UE sends to the Radio Access Network a Registration Request. This contains information indicating that the Registration type is mobility registration, and a Temporary User ID for the UE indicating an identity of the source MME. The Registration Request may optionally also contain parameters that the MME can parse. Such parameters can for example include the EPS UE Core Network Capability, the EPS key set identifier, and/or the EPC Non Access Stratum (NAS) sequence number. The Registration Request may optionally also contain parameters that the MME cannot parse. Such parameters can for example include the UE 5G Core Network (5GCN) Capability, and/or a 5G parameter to support network slice selection (for example NSSAI).

In addition, the UE also constructs a legacy TAU Request that the source MME would be able to parse. The TAU Request contains all the parameters from the Registration Request that the MME can parse and also includes a genuine EPS Globally Unique Temporary ID (GUTI). In some examples, the UE may not construct a full TAU message, but may include only sufficient Information Elements to enable the AMF to create a protected TAU for sending to the MME for verification (see below).

More generally, the UE can send any message (for use in any second network), with a message format that makes use of the legacy security header and related parameters (in this example the NAS security header and related parameters). The NAS security header and additional security parameters can then be used by the source MME to validate the checksum in MAC. In other respects, the message from the UE may be of an arbitrary format.

The UE integrity protects at least a part of the Registration Request. In some examples, the UE integrity protects an Extended Packet System (EPS) Non Access Stratum (NAS) message. More specifically, in this example, the UE integrity protects the TAU Request. Specifically, the UE may integrity protect the TAU Request with a Message Authentication Code (MAC). The MAC may be computed with at least a part of the Extended Packet System (EPS) security context matching the one that is stored in the source MME. For example, the security context may contain keys to be used for encryption and for integrity protection, but in some examples only the keys for integrity protection are used in computing the MAC.

Thus, in step 201, the UE sends to the Radio Access Network the Registration Request, the TAU Request, and the MAC included in the TAU Request.

In step 202, the RAN forwards the received Registration Request, also including the TAU Request, and the MAC included in the TAU Request, to the target AMF.

In step 203, the target AMF sends a message to the source MME to request user information relating to the UE. In some examples, the message requesting UE information is a Context Request message. In some examples, the Context Request message includes the complete integrity protected TAU Request message, and other parameters, for example such as the Globally Unique Temporary ID (GUTI) and/or a MME address.

In step 204, the source MME receives the Context Request message, and checks the integrity of the integrity protected part of the received message. For example, in the cases described above, the source MME computes a MAC for the TAU Request. The MAC is computed with the same part of the Extended Packet System (EPS) security context that is used by the UE. The MME may use the EPS GUTI to find the UE context including the security context for computing the MAC.

Thus, the source MME is able to check that the MAC that it computes is identical to the MAC contained in the received Context Request message. If so, the source MME can confirm that the message has not been tampered with.

If the source MME determines that the message has not been tampered with, it sends the requested user information to the target AMF in response to the Context Request message in step 205.

If the source MME determines that the integrity check is failed, and hence that the message has potentially been tampered with, it may still send the requested user information to the target AMF in step 205, but it will indicate that the UE could not be authenticated. The failed authentication can be used by the target system as a trigger to authenticate the UE in order to establish new security keys (since the user could not be authenticated using the existing security keys).

In some examples, when constructing the legacy message, such as the legacy TAU message for including in the Registration Request to the RAN, the UE may use the EPS security context matching the one that is stored in the source MME to derive a mapped 5G security context. The UE may also generate a Key Set Identifier (KSI), such as a ngKSI, to identify the EPS security context used for deriving the mapped 5G security context, and may include the generated KSI in the Registration Request message. The UE may also in some examples include UE 5G security capabilities in the Registration Request message.

On receipt of the context response message from the source MME in step 205, the target AMF may use the KSI included in the Registration Request message to identify the EPS security context that was used by the UE to derive a mapped 5G security context, from the EPS security context information included in the context response message. The AMF may then derive the same mapped 5G security context in step 208.

In further examples, the UE may have stored a native 5G security context, in addition to an EPS security context. Such a native 5G security context may for example have been established during an earlier connection to the 5G network. In such examples, the UE may include its 5G security capabilities and an appropriate ngKSI in the Registration Request message. The UE may integrity protect the entire Registration Request message using the native 5G security context. This integrity protection of the entire Registration Request message using a 5G security context may be in addition to the integrity protection of the legacy message included in the Registration Request message using the EPS security context. The integrity protection of the entire Registration Request message may be conducted by using at least a part of the 5G security context to calculate a MAC and including the MAC with the Registration Request message.

The AMF may verify the integrity of the Registration Request message using the 5G security context at step 206. If the verification is successful, the AMF may, at step 207, dispose of any security parameters received from the source MME in the Context Response message. If the verification fails or the 5G UE context is not available to allow verification to take place, the AMF may then treat the Registration request message as unprotected. In such cases, the AMF may either derive a mapped 5G security context in step 208 from the EPS context received from the source MME in the Context Response message, or the AMF may initiate an authentication procedure to create a new native 5G security context in step 209. The AMF may then activate the resulting security context (mapped or native) by a NAS SMC procedure.

Figure 3:
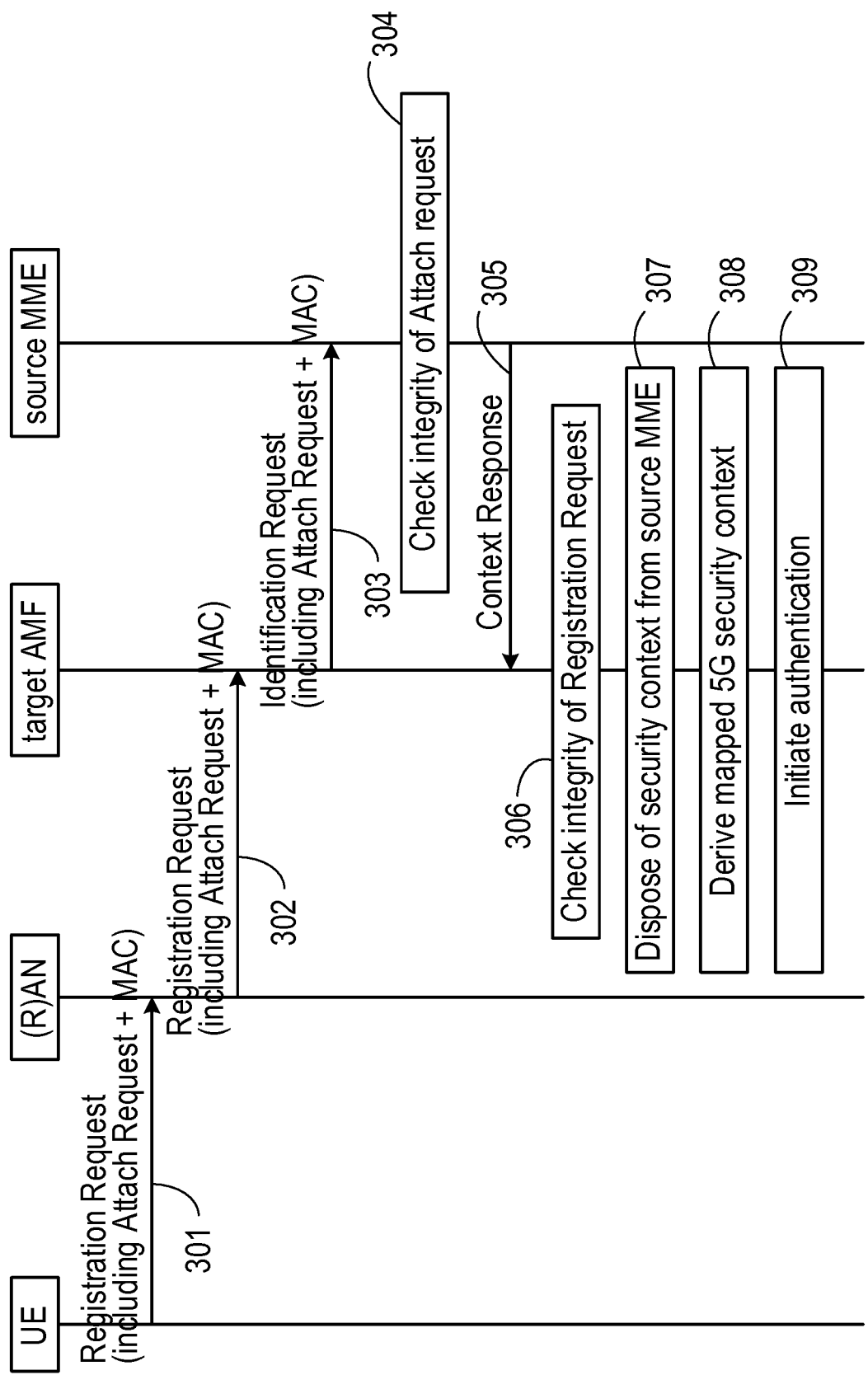
FIG. 3 is a signaling diagram illustrating a second procedure.

FIG. 3 is a signaling diagram illustrating a second procedure in the example where the first network function is a Mobility Management Entity (MME), and the second network function is an Access and Mobility Management Function (AMF).

Specifically, FIG. 3 illustrates a procedure where a UE is being served by a source MME, but requires to register with a target AMF. More specifically, FIG. 3 illustrates a procedure where the registration is based on attach.

In step 301, the UE sends to the Radio Access Network a Registration Request. This contains information indicating that the Registration type is an initial registration, and a Temporary User ID for the UE indicating an identity of the source MME. The Registration Request may optionally also contain parameters that the MME can parse. Such parameters can for example include the EPS UE Core Network Capability, the EPS key set identifier, and/or the EPC Non Access Stratum (NAS) sequence number. The Registration Request may optionally also contain parameters that the MME cannot parse. Such parameters can for example include the UE 5G Core Network (5GCN) Capability, and/or a 5G parameter to support network slice selection (for example NSSAI).

In addition, the UE also constructs a legacy Attach Request that the source MME would be able to parse. The Attach Request contains some or all of the parameters from the Registration Request that the MME can parse.

More generally, the UE can send any message (for use in any second network), with a message format that makes use of the legacy security header and related parameters (in this example the NAS security header and related parameters). The NAS security header and additional security parameters can then be used by the source MME to validate the checksum in MAC. In other respects, the message from the UE may be of an arbitrary format.

The UE integrity protects at least a part of the Registration Request. In some examples, the UE integrity protects an Extended Packet System (EPS) Non Access Stratum (NAS) message. More specifically, in this example, the UE integrity protects the Attach Request. Specifically, the UE may integrity protect the Attach Request with a Message Authentication Code (MAC). The MAC may be computed with at least a part of the Extended Packet System (EPS) security context matching the one that is stored in the source MME. For example, the security context may contain keys to be used for encryption and for integrity protection, but in some examples only the keys for integrity protection are used in computing the MAC.

Thus, in step 301, the UE sends to the Radio Access Network the Registration Request, the Attach Request, and the MAC included in the Attach Request.

In step 302, the RAN forwards the received Registration Request, also including the Attach Request, and the MAC included in the Attach Request, to the target AMF.

In step 303, the target AMF sends a message to the source MME to request user information relating to the UE. In some examples, the message requesting UE information is an Identification Request message. In some examples, the Identification Request message includes the complete integrity protected Attach Request message, and other parameters, for example such as an old Globally Unique Temporary ID (GUTI).

In step 304, the source MME receives the Identification Request message, and checks the integrity of the integrity protected part of the received message. For example, in the cases described above, the source MME computes a MAC for the Attach Request. The MAC is computed with the same part of the Extended Packet System (EPS) security context that is used by the UE.

Thus, the source MME is able to check that the MAC that it computes is identical to the MAC contained in the received Identification Request message. If so, the source MME can confirm that the message has not been tampered with.

If the source MME determines that the message has not been tampered with, it sends the requested user information to the target AMF in response to the Identification Request message in step 305.

If the source MME determines that the integrity check is failed, and hence that the message has potentially been tampered with, it will indicate that the UE could not be authenticated, and it may not send any security related information to the target AMF in step 305. The failed authentication can be used by the target system as a trigger to authenticate the UE in order to establish new security keys (since the user could not be authenticated using the existing security keys).

In some examples, when constructing the legacy message, such as the legacy attach message for including in the Registration Request to the RAN, the UE may use the EPS security context matching the one that is stored in the source MME to derive a mapped 5G security context. The UE may also generate a Key Set Identifier (KSI), such as a ngKSI, to identify the EPS security context used for deriving the mapped 5G security context, and may include the generated KSI in the Registration Request message. The UE may also in some examples include UE 5G security capabilities in the Registration Request message.

On receipt of the context response message from the source MME in step 305, the target AMF may use the KSI included in the Registration Request message to identify the EPS security context that was used by the UE to derive a mapped 5G security context, from the EPS security context information included in the context response message. The AMF may then derive the same mapped 5G security context in step 308.

In further examples, the UE may have stored a native 5G security context, in addition to an EPS security context. Such a native 5G security context may for example have been established during an earlier connection to the 5G network. In such examples, the UE may include its 5G security capabilities and an appropriate ngKSI in the Registration Request message. The UE may integrity protect the entire Registration Request message using the native 5G security context. This integrity protection of the entire Registration Request message using a 5G security context may be in addition to the integrity protection of the legacy message included in the Registration Request message using the EPS security context. The integrity protection of the entire Registration Request message may be conducted by using at least a part of the 5G security context to calculate a MAC and including the MAC with the Registration Request message.

The AMF may verify the integrity of the Registration Request message using the 5G security context at step 306. If the verification is successful, the AMF may, at step 307, dispose of any security parameters received from the source MME in the Context Response message. If the verification fails or the 5G UE context is not available to allow verification to take place, the AMF may then treat the Registration request message as unprotected. In such cases, the AMF may either derive a mapped 5G security context in step 308 from the EPS context received from the source MME in the Context Response message, or the AMF may initiate an authentication procedure to create a new native 5G security context in step 309. The AMF may then activate the resulting security context (mapped or native) by a NAS SMC procedure.

Figure 4:
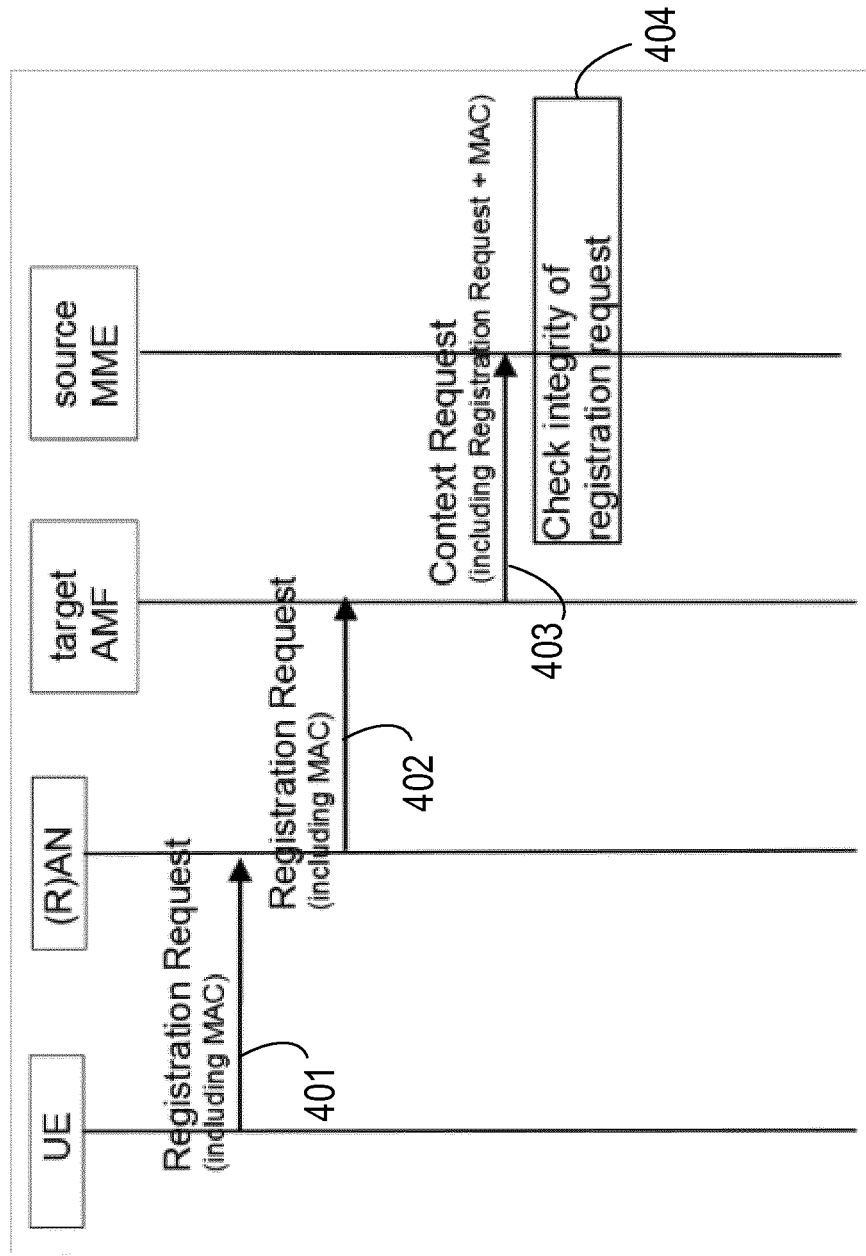
FIG. 4 is a signaling diagram illustrating a third procedure.

FIG. 4 is a signaling diagram illustrating a third procedure in the example where the first network function is a Mobility Management Entity (MME), and the second network function is an Access and Mobility Management Function (AMF).

Specifically, FIG. 4 illustrates a procedure where a UE is being served by a source MME, but requires to register with a target AMF. More specifically, FIG. 4 illustrates a procedure where the registration is based on location update, including a tracking area update (TAU).

In step 401, the UE sends to the Radio Access Network a Registration Request. This contains information indicating that the Registration type is mobility registration, and a Temporary User ID for the UE indicating an identity of the source MME. The Registration Request may optionally also contain parameters that the MME can parse. Such parameters can for example include the EPS UE Core Network Capability, the EPS key set identifier, and/or the EPC Non Access Stratum (NAS) sequence number. The Registration Request may optionally also contain parameters that the MME cannot parse. Such parameters can for example include the UE 5G Core Network (5GCN) Capability, and/or a 5G parameter to support network slice selection (for example NSSAI).

The UE integrity protects at least a part of the Registration Request. In this example, the UE integrity protects the whole Registration Request message. More specifically, in this example, the UE integrity protects the Registration Request message with a Message Authentication Code (MAC). The MAC may be computed with at least a part of the Extended Packet System (EPS) security context matching the one that is stored in the source MME. For example, the security context may contain keys to be used for encryption and for integrity protection, but in some examples only the keys for integrity protection are used in computing the MAC.

The integrity protection making use of the legacy Non Access Stratum (NAS) security header enables the MME to verify the MAC, as described further below.

Thus, in step 401, the UE sends to the Radio Access Network the Registration Request, and the MAC included in the Registration Request.

In step 402, the RAN forwards the received Registration Request, also including the MAC, to the target AMF.

In step 403, the target AMF sends a message to the source MME to request user information relating to the UE. In some examples, the message requesting UE information is a Context Request message. In some examples, the Context Request message includes the complete integrity protected Registration Request message.

In step 404, the source MME receives the Context Request message, and checks the integrity of the integrity protected part of the received message. For example, in the cases described above, the source MME computes a MAC for the complete integrity protected Registration Request message. The MAC is computed with the same part of the Extended Packet System (EPS) security context that is used by the UE. Thus, a legacy MME is able to check the integrity of the included Registration Request message using the included legacy NAS security header.

Thus, the legacy MME is able to verify the entire registration request message which is of 5G NAS type.

If the source MME determines that the message has not been tampered with, it sends the requested user information to the target AMF in response to the Context Request message.

If the source MME determines that the integrity check is failed, and hence that the message has potentially been tampered with, it may still send the requested user information to the target AMF, but it will indicate that the UE could not be authenticated. The failed authentication can be used by the target system as a trigger to authenticate the UE in order to establish new security keys (since the user could not be authenticated using the existing security keys).

Figure 5:
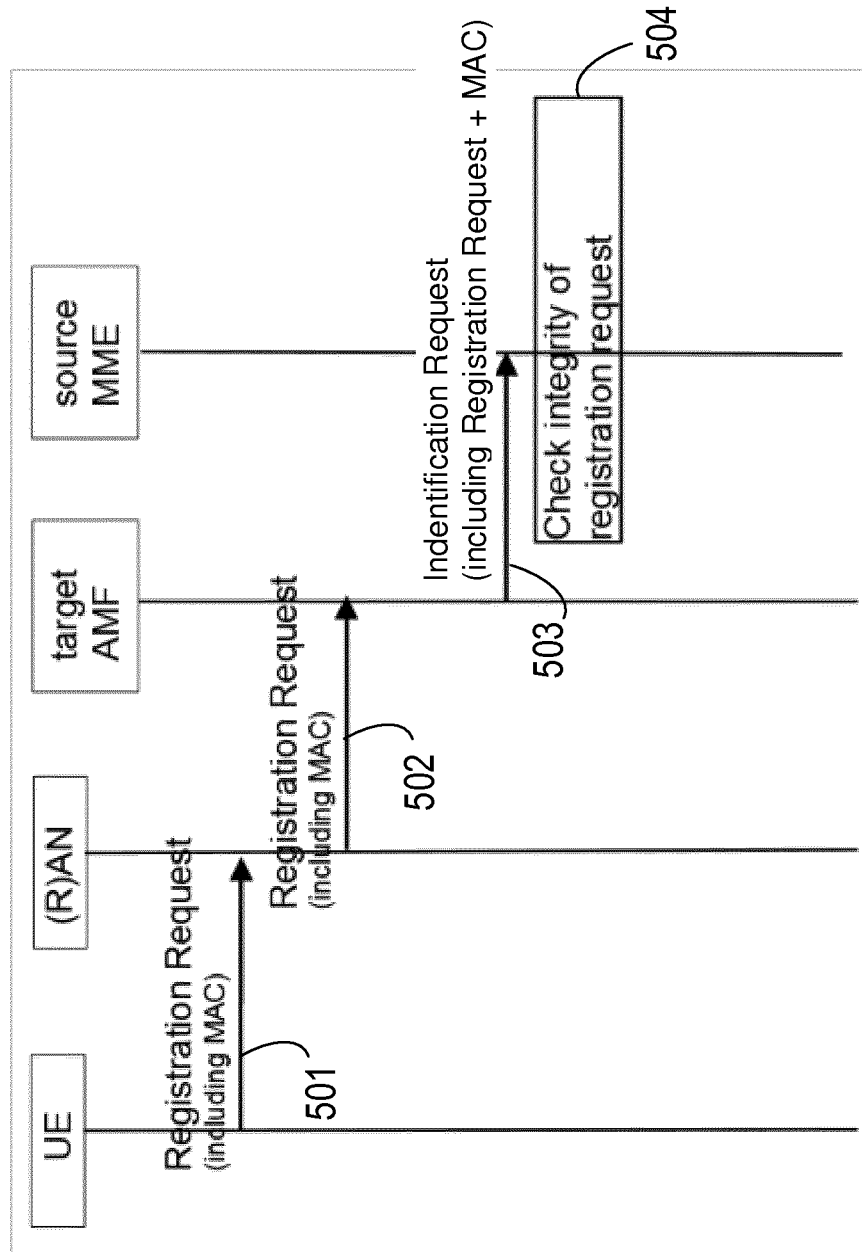
FIG. 5 is a signaling diagram illustrating a fourth procedure.

FIG. 5 is a signaling diagram illustrating a fourth procedure in the example where the first network function is a Mobility Management Entity (MME), and the second network function is an Access and Mobility Management Function (AMF).

Specifically, FIG. 5 illustrates a procedure where a UE is being served by a source MME, but requires to register with a target AMF. More specifically, FIG. 5 illustrates a procedure where the registration is based on attach.

In step 501, the UE sends to the Radio Access Network a Registration Request. This contains information indicating that the Registration type is an initial registration, and a Temporary User ID for the UE indicating an identity of the source MME. The Registration Request may optionally also contain parameters that the MME can parse. Such parameters can for example include the EPS UE Core Network Capability, the EPS key set identifier, and/or the EPC Non Access Stratum (NAS) sequence number. The Registration Request may optionally also contain parameters that the MME cannot parse. Such parameters can for example include the UE 5G Core Network (5GCN) Capability, and/or a 5G parameter to support network slice selection (for example NSSAI).

The UE integrity protects at least a part of the Registration Request. In this example, the UE integrity protects the whole Registration Request message. More specifically, in this example, the UE integrity protects the Registration Request message with a Message Authentication Code (MAC). The MAC may be computed with at least a part of the Extended Packet System (EPS) security context matching the one that is stored in the source MME. For example, the security context may contain keys to be used for encryption and for integrity protection, but in some examples only the keys for integrity protection are used in computing the MAC.

The integrity protection making use of the legacy Non Access Stratum (NAS) security header enables the MME to verify the MAC, as described further below.

Thus, in step 501, the UE sends to the Radio Access Network the Registration Request, and the MAC.

In step 502, the RAN forwards the received Registration Request, also including the MAC, to the target AMF.

In step 503, the target AMF sends a message to the source MME to request user information relating to the UE. In some examples, the message requesting UE information is an Identification Request message. In some examples, the Identification Request message includes the complete integrity protected Registration Request message.

In step 504, the source MME receives the Identification Request message, and checks the integrity of the integrity protected part of the received message. For example, in the cases described above, the source MME computes a MAC for the complete integrity protected Registration Request message. The MAC is computed with the same part of the Extended Packet System (EPS) security context that is used by the UE. Thus, a legacy MME is able to check the integrity of the included Registration Request message using the included legacy NAS security header.

Thus, the legacy MME is able to verify the entire registration request message which is of 5G NAS type.

If the source MME determines that the message has not been tampered with, it sends the requested user information to the target AMF in response to the Identification Request message.

If the source MME determines that the integrity check is failed, and hence that the message has potentially been tampered with, it will indicate that the UE could not be authenticated, and it may not send any security related information to the target AMF. The failed authentication can be used by the target system as a trigger to authenticate the UE in order to establish new security keys (since the user could not be authenticated using the existing security keys).

Figure 6:
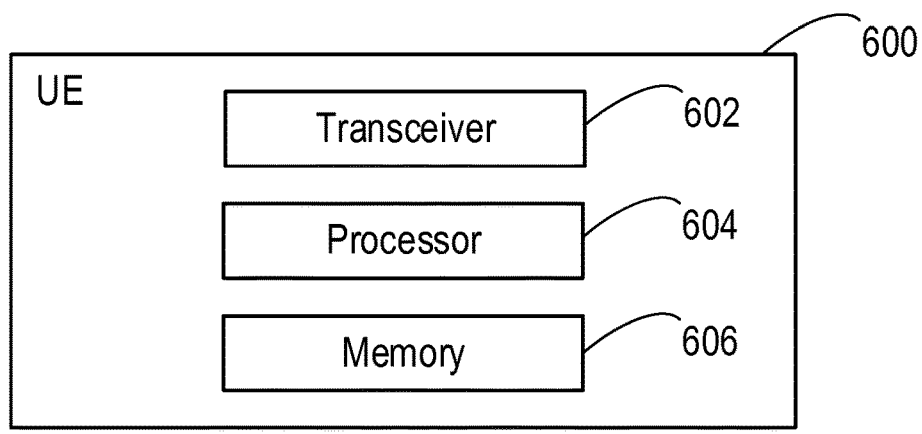
FIG. 6 is a block diagram illustrating a user equipment device.

FIG. 6 is a block diagram illustrating an apparatus which may carry out methods for operating a user equipment device. The apparatus may be located in the user equipment device or may be located remotely therefrom.

As mentioned above, the term user equipment device (UE) is used herein to refer to any terminal device, whether that device is intended to be a user-operated device such as a smartphone, tablet or laptop computer, or the like, or whether that device is intended to operate independently, for example as a remote sensor of the like. Similarly, the UE may be intended to operate from a generally fixed location, for example in the case of a closed-circuit TV camera or the like, or may be intended to be mobile, for example in the case of a smartphone, tablet or laptop computer, tracking device, or the like.

The apparatus 600 shown in FIG. 6 comprises at least one transceiver 602 for connecting to various functions in a communications network, at least one processor 604 and at least one memory 606. The memory 606 contains instructions executable by the processor 604 such that the apparatus 600 is operative to conduct some or all of the steps of the method for operating a UE described above and set out in the claims.

Figure 7:
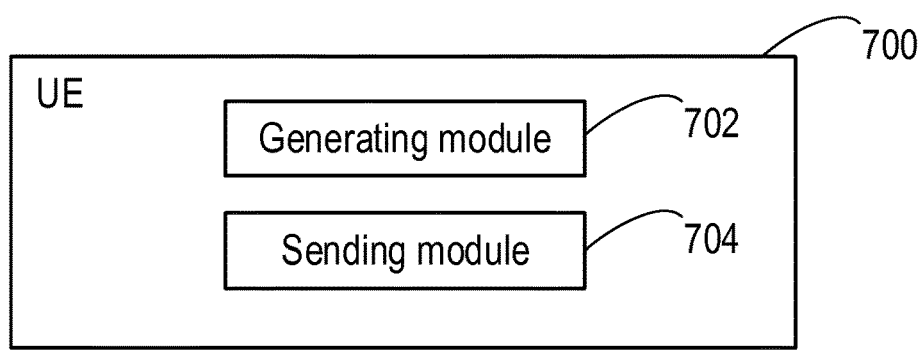
FIG. 7 is a block diagram illustrating a user equipment device.

FIG. 7 illustrates an alternative example apparatus 700, which may implement methods for operating a UE as discussed above and set out in the claims, for example on receipt of suitable instructions from a computer program. It will be appreciated that the modules illustrated in FIG. 7 may be realised in any appropriate combination of hardware and/or software. For example, the modules may comprise one or more processors and one or more memories containing instructions executable by the one or more processors. The modules may be integrated to any degree.

Referring to FIG. 7, the apparatus 700 comprises, for when the UE is served by a source first network function in a first network and requires to register with a target second network function in a second network: a generating module 702, for generating a registration request with integrity protection for at least a part of the registration request; and a sending module 704, for sending an integrity protected part of the registration request to the source first network function via the target second network function.

Figure 8:
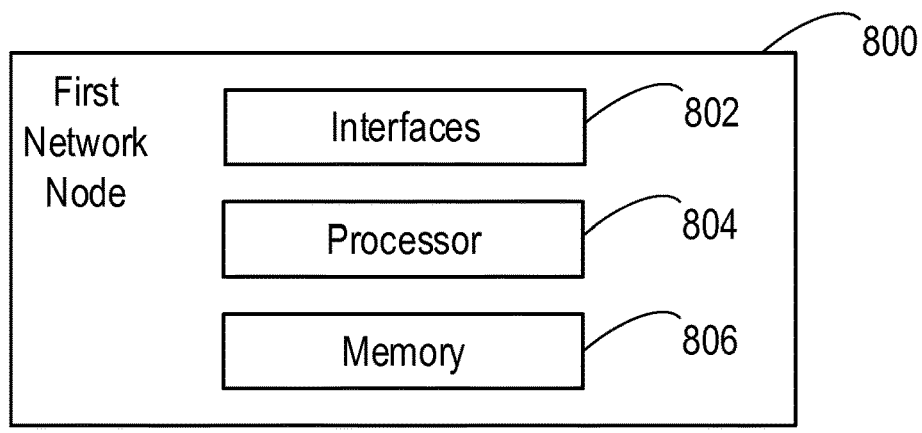
FIG. 8 is a block diagram illustrating apparatus for implementing a first network function.

FIG. 8 illustrates a first example of an apparatus 800 which may carry out methods for operating a first network function, which may in this illustrated example be a Mobility Management Entity (MME) function. The apparatus may for example comprise a network node and may comprise a plurality of network nodes. The apparatus may be located in a first network node or may be located remotely therefrom.

The apparatus 800 may carry out the methods for example on receipt of suitable instructions from a computer program. Referring to FIG. 8, the apparatus comprises interfaces 802, for connecting to other functions and terminals in the network, a processor 804, and a memory 806. The memory 806 contains instructions executable by the processor 804 such that the apparatus 800 is operative to conduct some or all of the steps of the methods for operating a first network function described above and set out in the claims.

Figure 9:
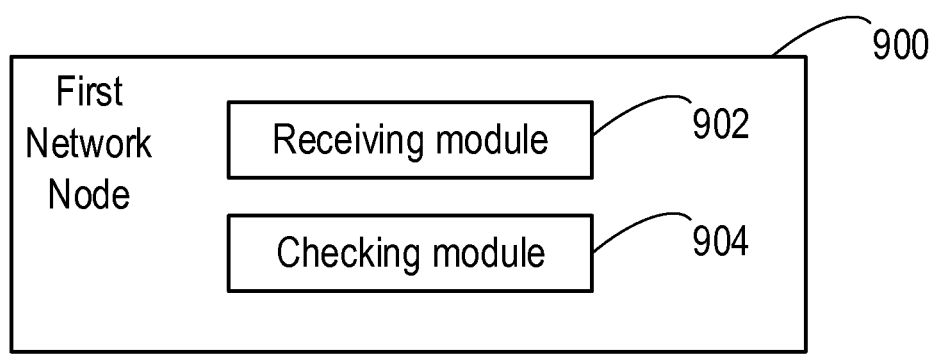
FIG. 9 is a block diagram illustrating apparatus for implementing a first network function.

FIG. 9 illustrates an alternative example apparatus 900, which may implement methods for operating a first network function, which may in this illustrated example be a Mobility Management Entity (MME) function as discussed above and set out in the claims, for example on receipt of suitable instructions from a computer program. The apparatus may for example comprise a network node and may comprise a plurality of network nodes. It will be appreciated that the modules illustrated in FIG. 9 may be realised in any appropriate combination of hardware and/or software. For example, the modules may comprise one or more processors and one or more memories containing instructions executable by the one or more processors. The modules may be integrated to any degree.

Referring to FIG. 9, the apparatus 900 comprises a receiving module 902 for receiving at least a part of a registration request from a User Equipment (UE) via a target second network function in a second wireless communications network, wherein the source first network function is serving the UE, and wherein the received registration request requests registration with said target second network function, and a checking module 904 for checking integrity of the received at least part of a registration request.

Figure 10:
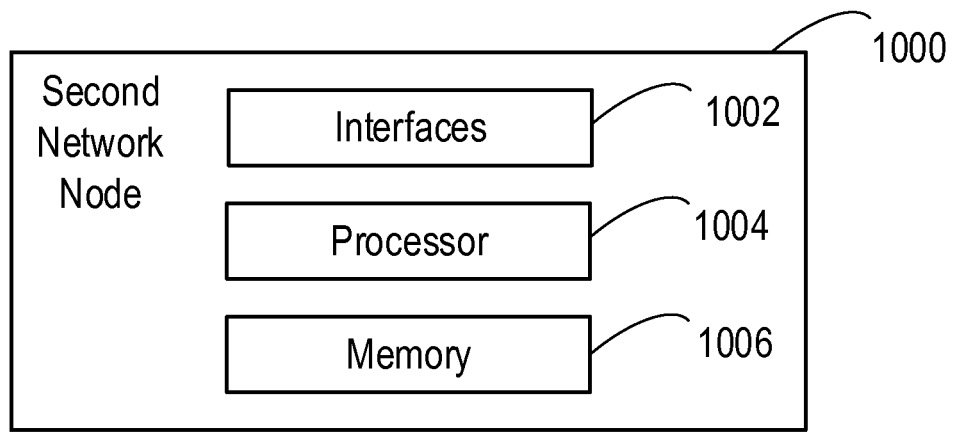
FIG. 10 is a block diagram illustrating apparatus for implementing a second network function.

FIG. 10 illustrates a first example of an apparatus 1000 which may carry out methods for operating a second network function, which may in this illustrated example be an Access and Mobility Management Function (AMF) function. The apparatus may for example comprise a network node and may comprise a plurality of network nodes. The apparatus may be located in a second network node or may be located remotely therefrom.

The apparatus 1000 may carry out the methods for example on receipt of suitable instructions from a computer program. Referring to FIG. 10, the apparatus comprises interfaces 1002, for connecting to other functions and terminals in the network, a processor 1004, and a memory 1006. The memory 1006 contains instructions executable by the processor 1004 such that the apparatus 1000 is operative to conduct some or all of the steps of the methods for operating a second network function described above and set out in the claims.

Figure 11:
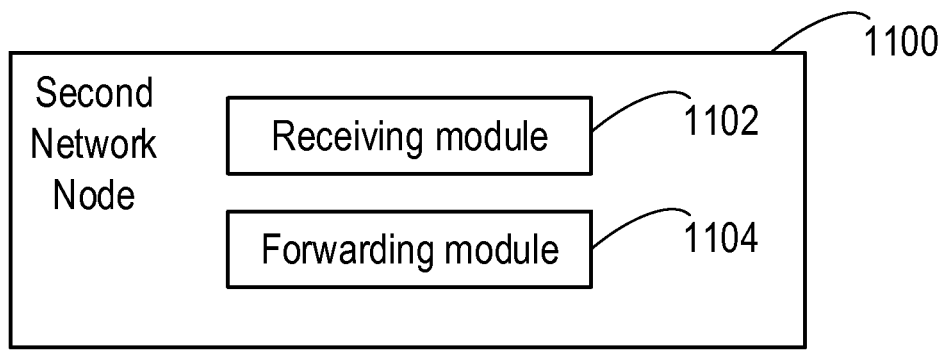
FIG. 11 is a block diagram illustrating apparatus for implementing a second network function.

FIG. 11 illustrates an alternative example apparatus 1100, which may implement methods for operating a second network function, which may in this illustrated example be an Access and Mobility Management Function (AMF) function as discussed above and set out in the claims, for example on receipt of suitable instructions from a computer program. The apparatus may for example comprise a network node and may comprise a plurality of network nodes. It will be appreciated that the modules illustrated in FIG. 11 may be realised in any appropriate combination of hardware and/or software. For example, the modules may comprise one or more processors and one or more memories containing instructions executable by the one or more processors. The modules may be integrated to any degree.

Referring to FIG. 11, the apparatus 1100 comprises a receiving module 1102 for receiving a registration request from a User Equipment (UE); and a forwarding module 1104 for forwarding a request to retrieve information about the UE to a first network function in a first network serving the UE.

Figure 12:
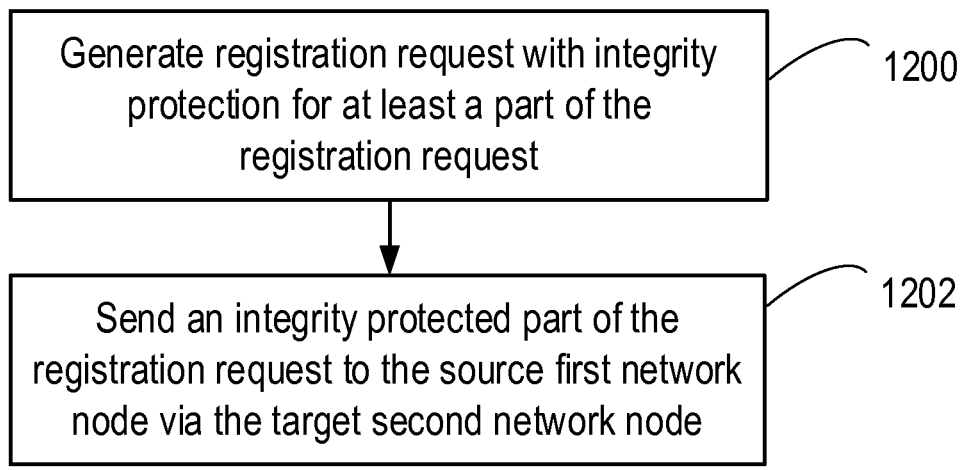
FIG. 12 is a flow chart, illustrating a procedure performed in a user equipment device.

FIG. 12 is a flow chart, illustrating a procedure performed in a User Equipment (UE), wherein the UE is served by a source first network function in a first network and requires to register with a target second network function in a second network. In step 1200, the UE generates a registration request with integrity protection for at least a part of the registration request. In step 1202, the UE sends an integrity protected part of the registration request to the source first network function via the target second network function.

Figure 13:
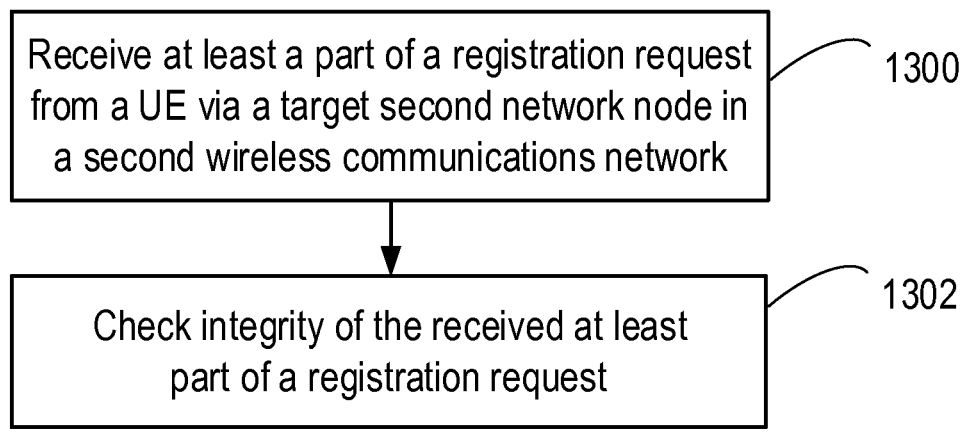
FIG. 13 is a flow chart, illustrating a procedure performed in a first network function.

FIG. 13 is a flow chart, illustrating a procedure performed in a source first network function in a first wireless communications network. In step 1300, the first network function receives at least a part of a registration request from a User Equipment (UE) via a target second network function in a second wireless communications network, wherein the source first network function is serving the UE, and wherein the received registration request requests registration with said target second network function. In step 1302, the first network function checks the integrity of the received at least part of a registration request.

Figure 14:
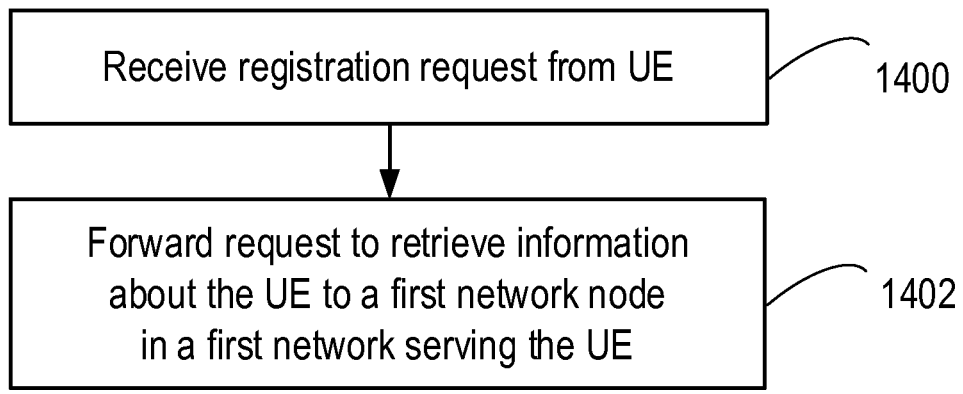
FIG. 14 is a flow chart, illustrating a procedure performed in a second network function.

FIG. 14 is a flow chart, illustrating a procedure performed in a second network function in a second network. In step 1400, the second network function receives a registration request from a User Equipment (UE). In step 1402, the second network function forwards a request to retrieve information about the UE to a first network function in a first network serving the UE.

According to aspects of the present disclosure, there is provided a carrier containing a computer program for performing any of the methods as discussed above, wherein the carrier comprises one of an electronic signal, optical signal, radio signal or computer readable storage medium.

According to aspects of the present disclosure, there is provided a computer program product comprising non transitory computer readable media having stored thereon a computer program as discussed above.

There is thus described methods and network elements that provide a mechanism for the protection of the registration request and hence mitigate against threats on the air interface such as man in the middle or replay attacks, and that provide a mechanism for a source network function such as an MME to authenticate a UE on behalf of a target network function such as an AMF.

The following are certain enumerated embodiments further illustrating various aspects the disclosed subject matter.

1. A method for operating a User Equipment (UE), wherein the UE is served by a source first network node in a first network and requires to register with a target second network node in a second network, the method comprising:
generating a registration request with integrity protection for at least a part of the registration request; and sending the integrity protected part of the registration request to the source first network node via the target second network node.

2. A method according to item 1, wherein the first network node is a Mobility Management Entity (MME) node.

3. A method according to item 1 or 2, wherein the second network node is an Access and Mobility Management Function (AMF) node.

4. A method according to item 1, 2 or 3, wherein the step of generating a registration request with integrity protection comprises generating a Message Authentication Code (MAC).

5. A method according to item 4, wherein the step of generating the registration request with integrity protection comprises generating a Message Authentication Code (MAC) using information shared between the UE and the source first network node.

6. A method according to item 5, wherein the first network node is a Mobility Management Entity (MME) node, and the information that is shared between the UE and the source MME is at least a part of an Evolved Packet System (EPS) security context.

7. A method according to one of items 1-6, wherein the first network node is a Mobility Management Entity (MME) node, and the integrity protected part of the registration request is an Evolved Packet Core (EPC) Non-Access Stratum (NAS) message.

8. A method according to item 7, wherein the EPC NAS message is a Tracking Area Update (TAU) request.

9. A method according to item 8, wherein the TAU request can be parsed by the source MME.

10. A method according to item 7, wherein the EPC NAS message is an Attach request.

11. A method according to item 10, wherein the Attach request can be parsed by the source MME.

12. A method according to one of items 1-6, wherein the second network node is an Access and Mobility Management Function (AMF) node, and the registration request is a 5G Non-Access Stratum (NAS) message.

13. A method according to item 12, wherein the integrity protected at least part of the registration request is the whole registration request.

14. A method according to item 12 or 13, wherein the registration request is a mobility registration request.

15. A method according to item 12 or 13, wherein the registration request is an attach registration request.

16. A User Equipment (UE), comprising a processor and a memory, the memory containing instructions for causing the processor to perform a method comprising,
when the UE is served by a source first network node in a first network and requires to register with a target second network node in a second network:
generating a registration request with integrity protection for at least a part of the registration request; and
sending the integrity protected part of the registration request to the source first network node via the target second network node.

17. A UE according to item 16, wherein the first network node is a Mobility Management Entity (MME) node.

18. A UE according to item 16 or 17, wherein the second network node is an Access and Mobility Management Function (AMF) node.

19. A UE according to item 16, 17 or 18, wherein the step of generating a registration request with integrity protection comprises generating a Message Authentication Code (MAC).

20. A UE according to item 19, wherein the step of generating the registration request with integrity protection comprises generating a Message Authentication Code (MAC) using information shared between the UE and the source first network node.

21. A UE according to item 20, wherein the first network node is a Mobility Management Entity (MME) node, and the information that is shared between the UE and the source MME is at least a part of an Evolved Packet System (EPS) security context.

22. A UE according to one of items 16-21, wherein the first network node is a Mobility Management Entity (MME) node, and the integrity protected part of the registration request is an Evolved Packet Core (EPC) Non-Access Stratum (NAS) message.

23. A UE according to item 22, wherein the EPC NAS message is a Tracking Area Update (TAU) request.

24. A UE according to item 23, wherein the TAU request can be parsed by the source MME.

25. A UE according to item 22, wherein the EPC NAS message is an Attach request.

26. A UE according to item 25, wherein the Attach request can be parsed by the source MME.

27. A UE according to one of items 16-21, wherein the second network node is an Access and Mobility Management Function (AMF) node, and the registration request is a 5G Non-Access Stratum (NAS) message.

28. A UE according to item 27, wherein the integrity protected at least part of the registration request is the whole registration request.

29. A UE according to item 27 or 28, wherein the registration request is a mobility registration request.

30. A UE according to item 27 or 28, wherein the registration request is an attach registration request.

31. A User Equipment (UE), the UE being configured to perform a method in accordance with any one of items 1-15.

32. A User Equipment (UE), comprising, for when the UE is served by a source first network node in a first network and requires to register with a target second network node in a second network:
a generating module, for generating a registration request with integrity protection for at least a part of the registration request; and
a sending module, for sending the integrity protected part of the registration request to the source first network node via the target second network node.

33. A computer program product, containing instructions for causing a User Equipment to perform a method in accordance with any one of items 1-15.

34. A method for operating a source first network node in a first wireless communications network, the method comprising:
receiving at least a part of a registration request from a User Equipment (UE) via a target second network node in a second wireless communications network,
wherein the source first network node is serving the UE, and
wherein the received registration request requests registration with said target second network node,
the method comprising:
checking integrity of the received at least part of a registration request.

35. A method according to item 34, wherein the first network node is a Mobility Management Entity (MME) node.

36. A method according to item 34 or 35, wherein the second network node is an Access and Mobility Management Function (AMF) node.

37. A method according to item 34, 35 or 36, wherein the step of checking the integrity comprises generating a Message Authentication Code (MAC).

38. A method according to item 37, wherein the step of checking the integrity comprises generating the Message Authentication Code (MAC) using information shared between the UE and the source first network node.

39. A method according to item 38, wherein the first network node is a Mobility Management Entity (MME) node, and the information that is shared between the UE and the source MME is at least part of an Evolved Packet System (EPS) security context.

40. A method according to one of items 34-39, wherein the first network node is a Mobility Management Entity (MME) node, and the integrity protected part of the registration request is an Evolved Packet Core (EPC) Non-Access Stratum (NAS) message.

41. A method according to item 40, wherein the EPC NAS message is a Tracking Area Update (TAU) request.

42. A method according to item 41, wherein the TAU request can be parsed by the source MME.

43. A method according to item 40, wherein the EPC NAS message is an Attach request.

44. A method according to item 43, wherein the Attach request can be parsed by the source MME.

45. A method according to one of items 34-39, wherein the second network node is an Access and Mobility Management Function (AMF) node, and the registration request is a 5G Non-Access Stratum (NAS) message.

46. A method according to item 45, wherein the integrity protected at least part of the registration request is the whole registration request.

47. A method according to item 45 or 46, wherein the registration request is a mobility registration request.

48. A method according to item 45 or 46, wherein the registration request is an attach registration request.

49. A method according to one of items 34-48, the method further comprising:
   in response to the received at least part of a registration request passing the integrity check, providing user information to the target second network node.

50. A method according to one of items 34-48, the method further comprising:
   in response to the received at least part of a registration request failing the integrity check, notifying the second network node that the UE may not be authenticated.

51. A first network node for use in a first wireless communications network, the first network node comprising a processor and a memory, the memory containing instructions for causing the processor to perform a method comprising:
   receiving at least a part of a registration request from a User Equipment (UE) via a target second network node in a second wireless communications network,
   wherein the source first network node is serving the UE, and
   wherein the received registration request requests registration with said target second network node,
   the method comprising:
   checking integrity of the received at least part of a registration request.

52. A first network node according to item 51, wherein the first network node is a Mobility Management Entity (MME) node.

53. A first network node according to item 51 or 52, wherein the second network node is an Access and Mobility Management Function (AMF) node.

54. A first network node according to item 51, 52 or 53, wherein the step of checking the integrity comprises generating a Message Authentication Code (MAC).

55. A first network node according to item 54, wherein the step of checking the integrity comprises generating the Message Authentication Code (MAC) using information shared between the UE and the source first network node.

56. A first network node according to item 55, wherein the first network node is a Mobility Management Entity (MME) node, and the information that is shared between the UE and the source MME is at least part of an Evolved Packet System (EPS) security context.

57. A first network node according to one of items 51-56, wherein the first network node is a Mobility Management Entity (MME) node, and the integrity protected part of the registration request is an Evolved Packet Core (EPC) Non-Access Stratum (NAS) message.

58. A first network node according to item 57, wherein the EPC NAS message is a Tracking Area Update (TAU) request.

59. A first network node according to item 58, wherein the TAU request can be parsed by the source MME.

60. A first network node according to item 57, wherein the EPC NAS message is an Attach request.

61. A first network node according to item 60, wherein the Attach request can be parsed by the source MME.

62. A first network node according to one of items 51-56, wherein the second network node is an Access and Mobility Management Function (AMF) node, and the registration request is a 5G Non-Access Stratum (NAS) message.

63. A first network node according to item 62, wherein the integrity protected at least part of the registration request is the whole registration request.

64. A first network node according to item 62 or 63, wherein the registration request is a mobility registration request.

65. A first network node according to item 62 or 63, wherein the registration request is an attach registration request.

66. A first network node according to one of items 51-65, the method further comprising:
   in response to the received at least part of a registration request passing the integrity check, providing user information to the target second network node.

67. A first network node according to one of items 51-65, the method further comprising:
   in response to the received at least part of a registration request failing the integrity check, notifying the second network node that the UE may not be authenticated.

68. A first network node, the first network node being configured to perform a method in accordance with any one of items 34-50.

69. A first network node for use in a first wireless communications network, the network node comprising:
   a receiving module for receiving at least a part of a registration request from a User Equipment (UE) via a target second network node in a second wireless communications network,
   wherein the source first network node is serving the UE, and
   wherein the received registration request requests registration with said target second network node, and a checking module for checking integrity of the received at least part of a registration request.

70. A computer program product, containing instructions for causing a first network node to perform a method in accordance with any one of items 34-50.

71. A method for operating a second network node in a second network, the method comprising:
receiving a registration request from a User Equipment (UE); and
forwarding a request to retrieve information about the UE to a first network node in a first network serving the UE.

72. A method according to item 71, wherein the second network node is an Access and Mobility Management Function (AMF) node.

73. A method according to item 71 or 72, wherein the first network node is a Mobility Management Entity (MME) node.

74. A method according to item 71, 72 or 73, comprising receiving the registration request from the User Equipment (UE) via an access network.

75. A method according to item 71, 72, 73 or 74, wherein the request to retrieve information about the UE comprises a context request.

76. A method according to item 75, wherein the first network node is a Mobility Management Entity (MME) node, and the context request comprises a Tracking Area Update Request from the registration request.

77. A method according to item 75, wherein the first network node is a Mobility Management Entity (MME) node, and the context request comprises the whole registration request.

78. A method according to item 71, 72, 73 or 74, wherein the request to retrieve information about the UE comprises an identification request.

79. A method according to item 78, wherein the first network node is a Mobility Management Entity (MME) node, and the identification request comprises an Attach Request from the registration request.

80. A method according to item 78, wherein the first network node is a Mobility Management Entity (MME) node, and the identification request comprises the whole registration request.

81. A method according to any one of items 71 to 80, wherein the request to retrieve information about the UE comprises at least a part of the registration request, and wherein said part of the registration request is integrity protected.

82. A second network node for use in a second wireless communications network, the second network node comprising a processor and a memory, the memory containing instructions for causing the processor to perform a method comprising:
receiving a registration request from a User Equipment (UE); and
forwarding a request to retrieve information about the UE to a first network node in a first network serving the UE.

83. A second network node according to item 82, wherein the second network node is an Access and Mobility Management Function (AMF) node.

84. A second network node according to item 82 or 83, wherein the first network node is a Mobility Management Entity (MME) node.

85. A second network node according to item 82, 83 or 84, wherein the method comprises receiving the registration request from the User Equipment (UE) via an access network.

86. A second network node according to item 82, 83, 84 or 85, wherein the request to retrieve information about the UE comprises a context request.

87. A second network node according to item 86, wherein the first network node is a Mobility Management Entity (MME) node, and the context request comprises a Tracking Area Update Request from the registration request.

88. A second network node according to item 86, wherein the first network node is a Mobility Management Entity (MME) node, and the context request comprises the whole registration request.

89. A second network node according to item 82, 83, 84 or 85, wherein the request to retrieve information about the UE comprises an identification request.

90. A second network node according to item 89, wherein the first network node is a Mobility Management Entity (MME) node, and the identification request comprises an Attach Request from the registration request.

91. A second network node according to item 89, wherein the first network node is a Mobility Management Entity (MME) node, and the identification request comprises the whole registration request.

92. A second network node according to any one of items 82 to 91, wherein the request to retrieve information about the UE comprises at least a part of the registration request, and wherein said part of the registration request is integrity protected.

93. A second network node for use in a second wireless communications network, the second network node, the second network node being configured for performing a method in accordance with any of items 71-81.

94. A second network node for use in a second wireless communications network, the second network node comprising:
a receiving module for receiving a registration request from a User Equipment (UE); and
a forwarding module for forwarding a request to retrieve information about the UE to a first network node in a first network serving the UE.

95. A computer program product, containing instructions for causing a second network node to perform a method in accordance with any one of items 71-81.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference signs in the claims shall not be construed so as to limit their scope.

The invention claimed is:

1. A method performed by a User Equipment (UE), the method comprising:
the UE generating a Tracking Area Update (TAU) message;
the UE generating a message authentication code (MAC) using the TAU message and a security context shared with a source network function in a first network, wherein the MAC enables the source network function to verify the integrity of the TAU message;
the UE generating a registration request message with integrity protection for at least a part of the registration request message; and
the UE sending the registration request message to the source network function in the first network via a target network function in a second network, wherein the UE is served by the source network function, wherein the step of generating the registration request message with integrity protection for at least a part of the registration request message comprises including in the registration request message: i) the TAU message and ii) the MAC, and the registration request message further comprises a temporary identifier that enables the target network function to identify the source network function.

2. The method of claim 1, wherein the source network function is a Mobility Management Entity (MME) function.

3. The method of claim 1, wherein the target network function is an Access and Mobility Management Function (AMF) function.

4. The method of claim 1, wherein the source network function is a Mobility Management Entity (MME) function, and an integrity protected part of the registration request is an Evolved Packet Core (EPC) Non-Access Stratum (NAS) message.

5. The method of claim 1, wherein the target network function is an Access and Mobility Management Function (AMF) function, and the registration request is a 5G Non-Access Stratum (NAS) message.

6. A User Equipment (UE), the UE comprising:
memory; and
processing circuitry coupled to the memory, wherein the UE is configured to perform a method comprising:
generating a Tracking Area Update (TAU) message;
generating a message authentication code (MAC) using the TAU message and a security context shared with a source network function in a first network, wherein the MAC enables the source network function to verify the integrity of the TAU message;
generating a registration request message with integrity protection for at least a part of the registration request message; and
sending the registration message to the source network function in the first network via a target network function in a second network, wherein the UE is served by the source network function, wherein the step of generating the registration request message with integrity protection for at least a part of the registration request message comprises including in the registration request message: i) the TAU message and the MAC, and the registration request message further comprises a temporary identifier that enables the target network function to identify the source network function.

7. The method of claim 1, wherein including the MAC in the registration request message comprises including the MAC in the TAU message.

8. The UE of claim 6, wherein the MAC is included in the TAU message.

* * * * *

UNITED STATES PATENT AND TRADEMARK OFFICE
CERTIFICATE OF CORRECTION

PATENT NO. : 11,102,649 B2
APPLICATION NO. : 16/481761
DATED : August 24, 2021
INVENTOR(S) : Jost et al.

Page 1 of 1

It is certified that error appears in the above-identified patent and that said Letters Patent is hereby corrected as shown below:

In the Claims

In Column 26, Lines 17-18, in Claim 6, delete "and the MAC, and" and insert -- and ii) the MAC, and --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*